US006792143B1

(12) United States Patent
Harmovaara

(10) Patent No.: US 6,792,143 B1
(45) Date of Patent: Sep. 14, 2004

(54) RECOGNITION OF HANDWRITING IN MOBILE STATION

(75) Inventor: Matti Harmovaara, Turku (FI)

(73) Assignee: Nokia Mobile Phones Ltd., Espoo (FI)

( * ) Notice: Subject to any disclaimer, the term of this patent is extended or adjusted under 35 U.S.C. 154(b) by 650 days.

(21) Appl. No.: 09/718,174

(22) Filed: Nov. 21, 2000

(30) Foreign Application Priority Data

Nov. 24, 1999 (FI) ............................................. 19992504

(51) Int. Cl.[7] ............................................... G06K 9/00
(52) U.S. Cl. .................... 382/189; 455/556.1; 379/67.1
(58) Field of Search ................................. 382/119, 181, 382/182, 183, 185, 186, 187, 188, 189; 455/550.1, 557, 556.1, 556.2; 345/863, 173; 379/67.1

(56) References Cited

U.S. PATENT DOCUMENTS 6,466,653 B1 * 10/2002 Hamrick et al. ........... 379/67.1

FOREIGN PATENT DOCUMENTS

| DE | 44 28 836 A1 | 2/1996 |
| EP | 0 782 357 A2 | 7/1997 |
| EP | 0 907 278 A2 | 4/1999 |
| GB | 2 329 300 A | 3/1999 |

OTHER PUBLICATIONS

Japanese Patent Application No.: JP 8163270, English Translation enclosed herewith.
Japanese Patent Application No. JP 7336759 English Translation enclosed herewith.
"Combining Data And Voice Communications On Digital Wireless Networks", Narayanaswamy et al., IEEE Globecom 1998, vol. 3, pp. 1449–1454.

* cited by examiner

Primary Examiner—Samir Ahmed
(74) Attorney, Agent, or Firm—Perman & Green, LLP

(57) ABSTRACT

The invention relates to improving the functions and applicability of a mobile station (201), (301), (401). Advantageous embodiments of the invention include a method in which graphic information may be input to a terminal equipment via a touch-sensitive writing pad and at the same time presented on a display in parallel with the independent execution of other functions, and a portable terminal equipment according to the method, which comprises a voice communicator (for text and file storage and transmission functions) and a display for presenting visual information as well as a graphic writing pad for entering input data in graphic format to the terminal equipment. In a communicator according to an embodiment of the invention a video terminal may be used in the information input simultaneously as a graphic writing pad and a display of the video terminal. The invention enables deaf and dumb people to communicate and take part in a video conference, for example.

8 Claims, 4 Drawing Sheets

Properties of mobile multimedia communicator

RECOGNITION OF HANDWRITING IN MOBILE STATION

TECHNOLOGICAL FIELD

The invention relates to the properties and applicability of a mobile station.

BACKGROUND OF THE INVENTION

A video conference or communication with e.g. deaf and dumb people requires the use of multimedia in which participants may send information (not just pictures, sound and video but also text-based information) to other participants and, on the other hand, receive and utilize information sent by other participants.

In addition to voice properties a modern portable phone may also have functions enabling it to transmit and receive text messages or multimedia messages, for example. Moreover, it is known that it is possible to transmit, receive and present a video image in digital format on a mobile station using a camera and a display attached to the mobile station.

Existing multimedia properties could be utilized e.g. in a video conference in which the participants communicate through a so-called video terminal. In the future it is advantageous that the characteristics of mobile stations and other terminal equipment can be made even more versatile.

SUMMARY OF THE INVENTION

Accordingly, it is an object of the invention to provide a versatile means of communication and a flexible user interface with wide applicability. In addition, it is an object of the invention to improve the characteristics of multimedia communicators. This can be achieved by providing the display or corresponding writing surface in a mobile station with text recognition capability.

The objects of the invention are achieved by using the display or a portion of the display of a mobile video phone or corresponding video communicator serving as a portable multimedia terminal or a separate writing surface as a touch-sensitive writing pad for the recognition and storing of handwritten text. To the storage it is possible to connect the use of a handwriting recognition algorithm for real-time updating and transmission of notes and text.

One embodiment of the invention is a method belonging to the realm of multimedia technology in which the touch-sensitive display of a mobile phone and a writing means, say an ordinary pencil, are used for real-time storing of handwritten text while at the same time the display may output other information such as a received video image, for example. At the same time the text may be converted into character-based format using a special recognition algorithm as well as be displayed on a video screen or on the apparatuses of the other participants in the video call. Texts may be sent and stored in a pixel- or character-based file for later use, say to be transmitted to a mobile communication or other network, and/or be used as parts of graphic images and text on the display. In addition to handwritten character recognition the method may be used to recognize the identity of the writer.

BRIEF DESCRIPTION OF DRAWINGS

The invention will now be described in more detail with reference to the advantageous embodiments presented by way of example and to the accompanying drawings wherein.

DETAILED DDESCRIPTION OF THE INVENTION

Electronic recognition of handwritten characters is known as such. Handwritten text can be recognized into characters using e.g. 3Com's Palm Pilot devices. Palm Pilot is a registered trademark owned by 3Com. It is known as such to add handwritten text recognition capability to an ordinary mobile phone (say, Qualcomm), as is disclosed e.g. in EP782357 A2. For character recognition has been proposed a motion detector in a portable phone system built in the form of a pen, with which actions directed to the text can be controlled by means of a special selector (GB 2329300A and EP0907278 A).

Moreover, proposals are known for telephone apparatuses without a handwriting recognition algorithm, in which apparatuses Asian characters to be transmitted either directly or through a cache memory are written by hand on a suitable sensitive display in a phone (EP782357 A2), whereby it is proposed that the display could be thermally, electrostatically, magnetically or optically sensitive or pressure sensitive so as to react to the action of a writing means.

Additionally, proposals are known for electric methods to store and process handwritten information in a compressed pixel-based image. The image is not encoded to a format understood by a computer in the terminal itself, but the encoding is carried out later in a separate external unit. The handwritten figures are detected in a writing block, by a pressure-sensitive module, as pixel-based graphics the information in which can be forwarded for encoding in a computer via a cable or RAM card (DE 4428836 A).

Figure 1:
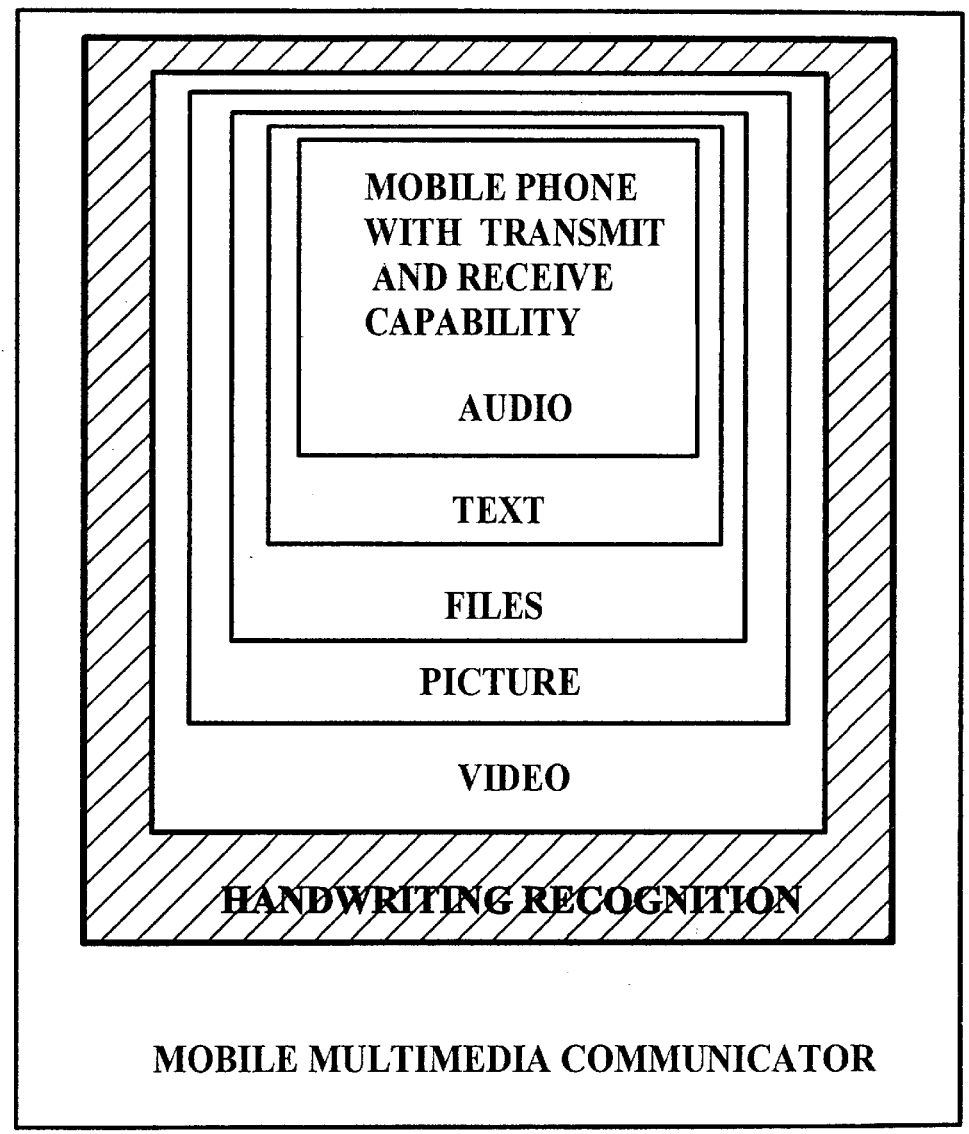
FIG. 1 illustrates the properties of a mobile multimedia communicator with respect to the invention.

The present invention uses a touch-sensitive display or a portion of such a display in the storage and display of handwritten alphanumeric text in conjunction with an algorithm that recognizes handwritten text to be transmitted and/or stored in character-based format. The invention enhances multimedia capabilities and applicability in communications technology by combining the properties of video, mobile phone and handwritten text recognition in order to provide a versatile multimedia communicator (FIG. 1). A terminal employing the method according to an embodiment of the invention enables persons with a hearing or speech defect to participate in a real-time video conference in which handwritten notes may be stored, combined and quickly conveyed by means of the invention to the participants to be further transmitted or stored as desired (FIGS. 2 and 3).

By way of alternative embodiments of the invention, it is noted that the aforementioned display may be constructed as a liquid crystal display or, alternatively, as a plasma display. Also, in the construction of the touch-sensitive writing pad, the writing pad may be constructed, in accordance with an embodiment, where the writing pad is pressure sensitive, temperature sensitive, magnetically sensitive, optically sensitive or elastically sensitive.

FIG. 1 illustrates the hierarchy of the development of the mobile phone, showing a conventional mobile station, or mobile phone, on the bottom of the "well". Conventionally, the characteristics of such a mobile phone include the functions required in the transmission and reception of voice. In the course of development the transmission and reception characteristics of the phone have become more diverse as various properties have been added in accordance with the figure. As a consequence the phone has become a means of communication, a communicator, which can be made even more versatile and applicable when still more functions are added.

Figure 2:
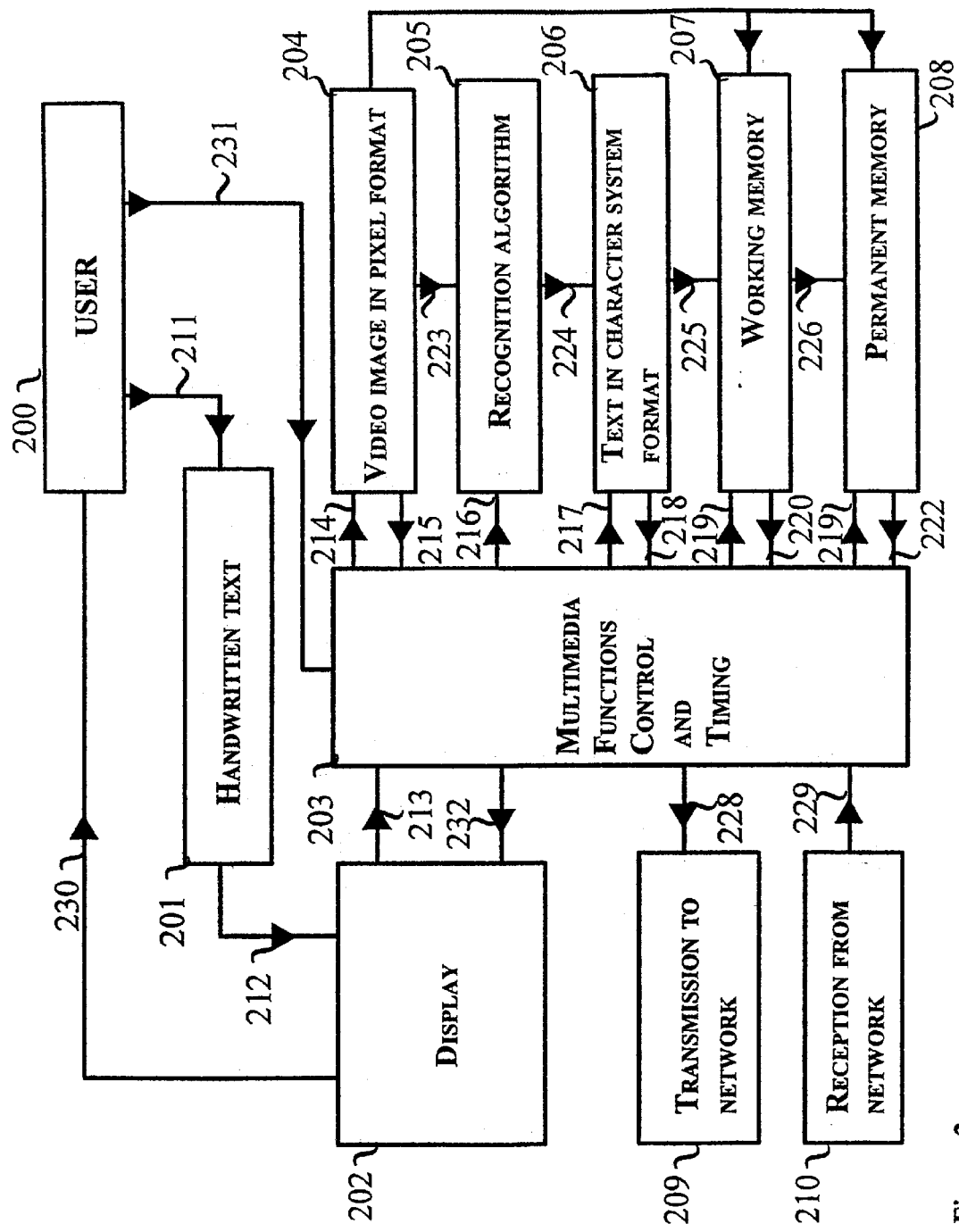
FIG. 2 illustrates the principle and functions of the invention when the embodiment of the invention is a mobile multimedia communicator or a corresponding portable terminal.
Figure 3:
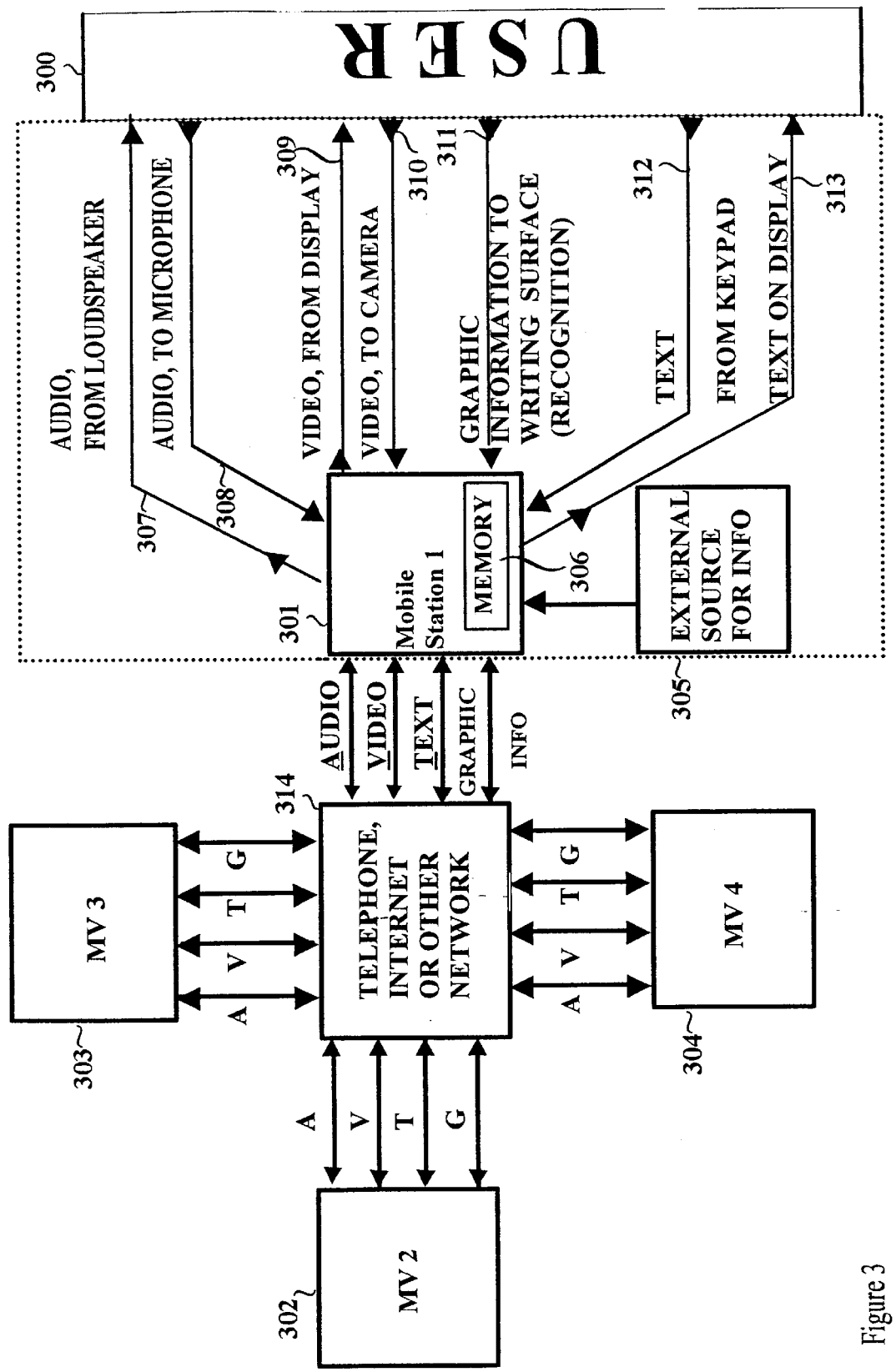
FIG. 3 illustrates the tasks of functions control according to the invention in a mobile station.

FIG. 2 illustrates in the form of block diagram the operating principle of a mobile multimedia communicator according to an embodiment of the invention. The user 200 writes text 201 on a touch-sensitive display 202. By means of functions control 203 in the mobile multimedia communicator the user 200 converts 213, 214 the handwritten text 201 entered on the display 202 into a pixel-based video image 204 and, if so desires, stores 227 it either in the working memory 207 or permanent memory 208. With the functions control 203, function 216 can be used to activate the handwriting recognition algorithm 205 which reads 223 the pixel-based video image 204 and converts 224 the text 201, 204 into a character system format 206. If the user 201 desires, the text 206 may be stored 225 by means of the multimedia functions control and timing 203 in the working memory 207 and further stored 226 in the permanent memory 208. Using the multimedia functions control and timing 203 the user 201 may pick 213 desired portions on the display 202 and input 214, 217, 219, 221 them by means of functions to be used in the communicator. In addition, by means of element 203 the user may fetch 232, through functions 215, 218, 220 and 222, material onto the display 202 and receive 229 from a network 210 a signal that can be processed by functions 214, 216, 217, 219 and 221 for the user and displayed 232 on the display 202. By means of element 203 the user may choose components from the display 202, pixel-based video image 204, character system based text 206, working memory 207 or from the permanent memory 208 to be transmitted 228 to the network 209. In that case the mobile station's read, display and transmission functions may be carried out in parallel to the extent and for the portions defined by the user.

FIG. 3 illustrates the functions of the multimedia function control and timing 203 according to the invention from the point of view of the user interface. A broken line defines the mobile station and the functions required of its user interface. The user 300 may use the mobile station 301 in conventional manner by receiving voice 307 through the loudspeaker and/or transmitting voice 308 through the microphone. In addition the user may read 309 a video signal on the display or transmit 310 a video signal through the mobile station 301, say from a camera. Additionally, the display may be used for writing in 311 graphic information when the text is in handwriting. On the keypad of the mobile station it is possible to enter 312 text in ASCII format to be displayed 313 on the mobile station's display. In addition, it is possible to select an external information source 305, e.g. at the end of a wire connection 314, for information input. The mobile station 301 also comprises a memory 306 for storing the material in question and placing it at the disposal of the user 300. The user 300 may by means of the mobile station 301 transmit, receive and/or present in accordance with FIG. 3 audio A, video V, text T or graphics G to the Internet or a corresponding network 314 for the other participants 302, 303 and 304 in the call.

Figure 4:
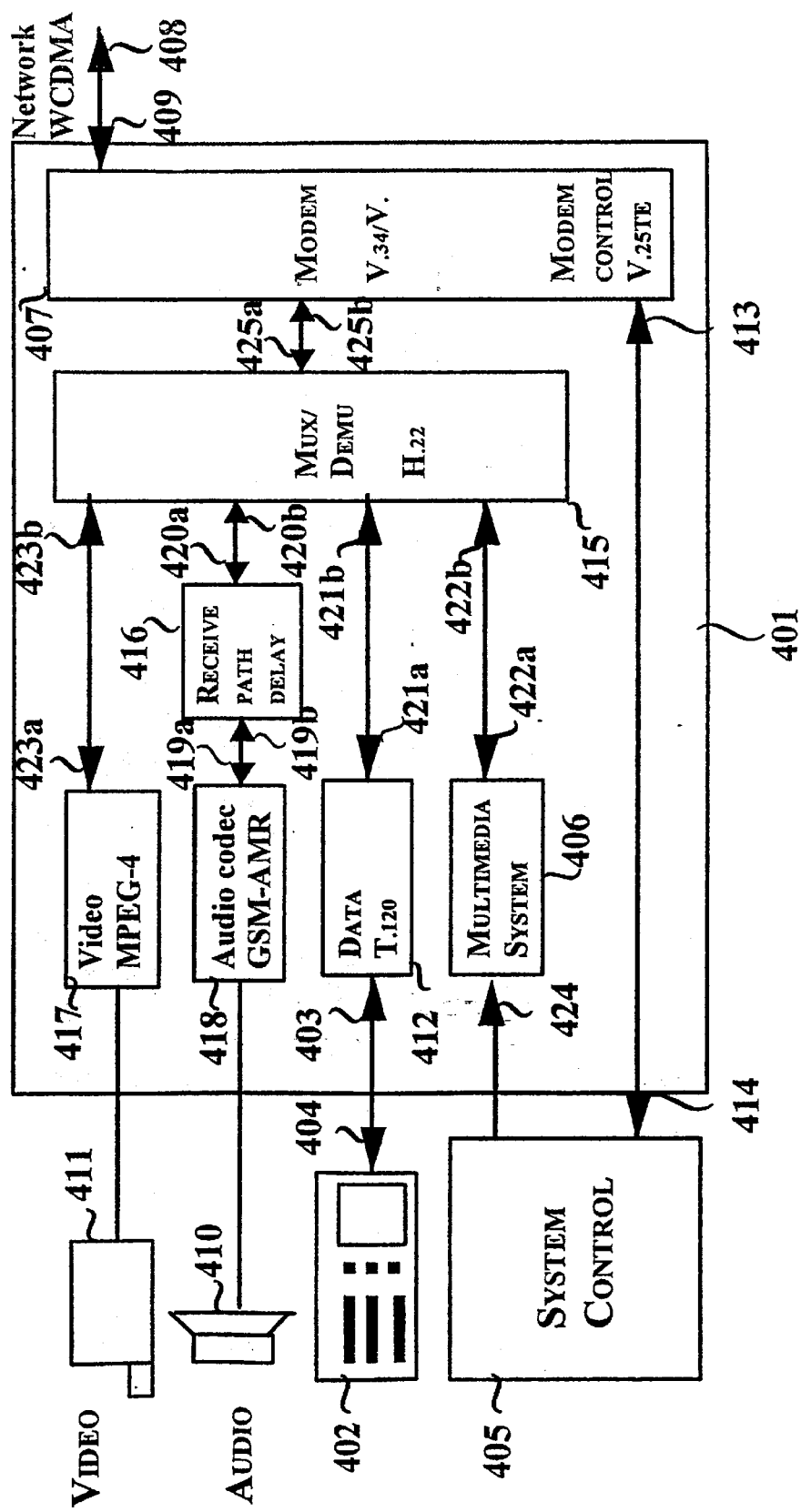
FIG. 4 shows a functional block diagram of an apparatus according to an embodiment of the invention.

Of the embodiments of the invention FIG. 4 shows a mobile equipment 401 with which it is possible to detect 403 and recognize by means of a special text recognition element 412 text written on the display 402. The mobile station also includes system control 405 with which the user of the equipment may control 424 the multimedia system 406 and the modem 407 of the equipment 401 as well as the transmission 408, 413, 425*b* and reception 409, 414, 425*a* functions. A video camera 411 may be connected to the mobile station so that the signal of said video camera is stored e.g. in MPEG-4 format on a video unit 417. Using function 423*b* it is possible to send 425*b*, 408 the video signal or portions of it via a mux/demux element 415 forward e.g. to a network or to other parts of the equipment such as the audio unit 418, handwriting recognition element 412, data protocol block 412*b* and display 402. The mux/demux element 415 enables the user to control through the system control 405 and multimedia system 406 signals coming from the different elements 417, 418, 412, 415 and apparatuses 411, 410, 402, 407 and combine the signals in a desired manner and to distribute them to other elements or apparatuses as well as to be sent to a network to be used as video conference material, for example.

The storage 212 of handwritten text 201 and the conversion of the text 201, 204 into alphanumeric letters (including characters specific to different cultural contexts as well as Cyrillic and Greek letters) can be performed 215, 217 in the manner chosen by the user through the functions control and timing 203. The text may be written 211, 311 and/or stored during and/or before a video conference to be distributed in video and/or character format to selectable parties 301, 302, 303, 304 participating in the video call (FIG. 3) whereby the receiving parties can be chosen such that a written and recognized message is delivered to either one or more conference parties, which receiving parties may be chosen prior to or during the call. The parties, which there may be two or more, may choose, by means of the functions control 203 in the terminal, which portions of the handwritten text are stored, and choose the storage format between character-based and/or video information. Recognition of the handwritten text into character format may be performed independent of the form of communication or regardless of whether one is a transmitting or receiving party of the text (FIG. 3). Handwritten texts may be used as notes in a video conference and stored 227, 230 in a file in a memory in the terminal itself, which memory may be a temporary so-called working memory 207 or a so-called permanent memory 208 of fixed or replaceable type, or the writings may be sent 226 in a manner and in a form defined by the user to a file in the address specified by the user. In addition to writing by hand 211, 201, 212, the files and graphics used by the communications terminal according to the method may be input to the touch-sensitive screen from a digital camera 310, 411, 417, scanner or other external apparatus 305 (FIG. 3) used for processing visual information, including mobile phones 226 and computers 226 operating through a cable, modem, acoustic or optical connection or via a network 314, so as to be combined with a data stream (FIG. 3) and be displayed to the extent defined by the user.

The handwritten text as a trace 212 left by a means of writing on the touch-sensitive screen (202, 311, 402) is recorded in pixel format 204 either to be stored temporarily in the memory 227 of the equipment or to be transmitted 226 as such in a video and/or data stream to a network 210. The characteristics of a user equipment (UE) employing the method according to the invention include the possibility of using 228 the handwriting recognition prior to the storage 227 or transmission 226 to recipients in the network 210. The different parties in a video conference may agree on handwriting recognition support at a hardware or user level using suitable equipment classification depending on the properties of the equipment used by the participants. Handwritten text may also be sent like a video image or as part of one either directly or later if any of the recipients or senders 301, 302, 303, 304 are temporarily incapable of handwriting recognition. The classification of the equipment may include information about the maximum number of blocks to be transmitted and power saving tx functions in addition to other functional parameters. User-to-user signaling (UUS) may be used in call set-up for negotiating about the need for handwriting recognition support if there is no information or classification on the equipment used in a conference involving the use of handwritten material. A receiving UE may have in its memory 306 a file specified in advance by the user, to which file received messages are saved in real time during the conference. The received messages may at the same time be updated and/or displayed 309 to the user 301, 302, 303, 304 through a portion of the display 202, 402. Updating of the text on the display and in the file may also happen simultaneously if the user so desires.

A transmitting party may want to send texts only to one or a few participants in the conference. In that case a separate data connection may be set up in order to transmit the text to one participant only. A second alternative is to send the text as SMS-MO to selected participants if the handwriting recognition has already been carried out in the transmitting equipment.

If the handwritten texts are sent in pixel format 204 they may be stored at the receiving end only as video and, therefore, the writings are stored as part of a video file 417 to the extent specified by the user (functions control 203, FIG. 2) or in a separate graphics file in which case text recognition is also possible if the user so desires.

The user interface (UI) of the UE comprises a command interface that may be used during the active part of the conference. Using the UI commands the user may control the handwritten text recognition locally (saved as a local file invisible to other participants). The user of the UE may change the handwritten text recognition from local use to transmission use during the active connection. Thus the user may select e.g. just one participant as the recipient.

All written text may be locally stored in a memory 306 in the UE. There may also be several files the purpose and accessibility to participants of which the user may define as desired. In addition, the handwritten texts may be completed prior to the video call and the UI can be used to control the delivery of the writings to the different parties. If the handwritten text is in the form of video the UE may be used to zoom in on or enlarge the material or handwritten text on any part of the display. The user may also specify, if he so desires, when he wants to interrupt the storing and/or display of the received text being displayed contemporaneously with the incoming video signal.

What is claimed is:

1. Terminal equipment for a radio system, comprising:
   a voice communicator,
   a display for presenting pictorial information,
   a graphic writing pad for entering input data in graphic format to the terminal equipment,
   means for realizing data transmission in a radio system in the form of voice, text, files, video image and graphic characters and
   means for independently recognizing handwriting in parallel with other listed functions.

2. The equipment according to claim 1, wherein a writing pad in the equipment comprises a display or part of it.

3. Equipment according to claim 2, wherein the display or part of it is sensitive to touch.

4. Equipment according to claim 3, wherein the display is a liquid crystal display.

5. Equipment according to claim 3, wherein the display is a plasma display.

6. Equipment according to claim 3, wherein the writing pad is pressure sensitive, temperature sensitive, magnetically sensitive, optically sensitive or electrostatically sensitive to react to the trace of a given means of writing.

7. Equipment according to claim 1, wherein the means of handwriting recognition is adapted so as to recognize typical features in the handwriting in order to verify the identity of the user.

8. A method for recognizing handwriting in terminal equipment of a radio system, comprising the steps of:
   reading graphic information drawn on a writing pad,
   converting the read graphic information to character format, and
   in parallel with the reading of the graphic information, performing one of the following functions on the graphic information converted to character format:
   transmission to radio system,
   local storage in terminal equipment,
   presentation on the display of terminal equipment, and
   acoustic reproduction.

* * * * *